(12) United States Patent
Toyoda et al.

(10) Patent No.: US 7,705,910 B2
(45) Date of Patent: Apr. 27, 2010

(54) PHOTOGRAPHIC DEVICE FOR OBTAINING A PLURALITY OF IMAGES AT A TIME BY ROLLING SHUTTER METHOD

(75) Inventors: Takashi Toyoda, Daito (JP); Yoshizumi Nakao, Daito (JP); Yasuo Masaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 550 days.

(21) Appl. No.: 11/644,973

(22) Filed: Dec. 26, 2006

(65) Prior Publication Data

US 2007/0140592 A1 Jun. 21, 2007

(30) Foreign Application Priority Data

Dec. 26, 2005 (JP) ............................. 2005-371753

(51) Int. Cl.
*H04N 5/222* (2006.01)

(52) U.S. Cl. ................. 348/370; 348/221.1; 348/230.1; 348/362

(58) Field of Classification Search .............. 348/221.1, 348/222.1, 230.1, 308, 362, 370, 371
See application file for complete search history.

(56) References Cited

U.S. PATENT DOCUMENTS

| | | | | |
|---|---|---|---|---|
| 6,278,490 | B1 * | 8/2001 | Fukuda et al. ............... | 348/371 |
| 6,654,062 | B1 * | 11/2003 | Numata et al. .............. | 348/370 |
| 7,223,956 | B2 * | 5/2007 | Yoshida .................... | 250/208.1 |
| 7,333,145 | B2 * | 2/2008 | Poplin ........................ | 348/371 |
| 2002/0140845 | A1 * | 10/2002 | Yoshida et al. .............. | 348/371 |
| 2003/0007088 | A1 * | 1/2003 | Rantanen et al. ............ | 348/371 |

FOREIGN PATENT DOCUMENTS

| | | |
|---|---|---|
| JP | H05-176233 A | 7/1993 |
| JP | 2003-309766 A | 10/2003 |

* cited by examiner

*Primary Examiner*—Gevell Selby
(74) *Attorney, Agent, or Firm*—Pillsbury Winthrop Shaw Pittman, LLP

(57) ABSTRACT

A photographic device includes an image sensor in which a plurality of pixels are arrayed. A vertical scan circuit selects horizontal drive lines of the image sensor in order. And a horizontal scan circuit reads out in order voltages due to electric charges from the pixels in the horizontal row which is selected by the vertical scan circuit. A plurality of optical lenses are arranged in a direction parallel to the vertical drive lines, and these optical lenses form images of the same photographic regions upon respective pixel regions which face them. The voltages due to electric charges are read out in order from the pixels, and a plurality of images are acquired with some time difference between them. The emission of light by a light source is controlled, so that photography in each of the pixel regions is performed in different photographic conditions.

5 Claims, 4 Drawing Sheets

PHOTOGRAPHIC DEVICE FOR OBTAINING A PLURALITY OF IMAGES AT A TIME BY ROLLING SHUTTER METHOD

CROSS REFERENCE

This Nonprovisional application claims priority under 35 U.S.C. § 119(a) on Patent Application No. 2005-371753 filed in Japan on Dec. 26, 2005, the entire contents of which are hereby incorporated by reference.

BACKGROUND OF THE INVENTION

The present invention relates to a photographic device which photographs an image of a photographic region using an image sensor such as a CMOS image sensor or the like.

There is a per se known type of prior art photographic device which creates a synthesized image in which the width of the dynamic range has been expanded.

With this type of device, a plurality of images of the same photographic region are photographed based upon different photographic conditions. And, with this device, from this plurality of images which have been obtained by this photography, a synthesized image in which the width of the dynamic range has been expanded is created.

With the device disclosed in Japanese Laid-Open Patent Publication 2003-309766, a plurality of images of the same photographic region are photographed with different light emission amounts from a light source. And, with this photographic device, a synthesized image in which the width of the dynamic range has been expanded is created using image data which has been photographed based upon a large light emission amount in relation to portions of the photographic region which are dark, and using image data which has been photographed based upon a small light emission amount in relation to portions of the photographic region which are bright.

Furthermore, with the device disclosed in Japanese Laid-Open Patent Publication H05-176233, a plurality of images are obtained under different photographic conditions by changing the exposure time period for each image.

With the devices described above, the same photographic region is photographed a plurality of times based upon different photographic conditions. Accordingly, it has been necessary to perform reading in of the accumulated electric charge from each pixel, and photographic frame processing, a plurality of times. However, a predetermined time period (such as a vertical retrace period and the like) has been required for performing this photographic frame processing a plurality of times. Accordingly, with such prior art type photographic devices which create a synthesized image in which the width of the dynamic range has been expanded by synthesizing together images whose photographic conditions are different; there has been a limit to shortening of the processing time. Moreover, with these types of photographic devices, a complicated structure and complicated signal processing have been necessary.

Thus, the object of the present invention is to provide a photographic device which, in a short processing time period, and furthermore with a simple structure, can create a synthesized image in which the width of the dynamic range has been expanded by synthesizing together images whose photographic conditions are different.

SUMMARY OF THE INVENTION

The photographic device of the present invention includes: an image sensor in which a plurality of pixels are arrayed in the form of a matrix; a row selection unit which selects the horizontal rows of the image sensor in order in the vertical direction; a read out unit which reads out electric charge from each pixel of the horizontal row which has been selected by the row selection unit, after exposure thereof; an imaging unit which forms images of the same photographic region upon each of a plurality of pixel regions into which the plurality of pixels of the image sensor are subdivided in the vertical direction; and a light emission control unit which controls the light emission amount of a light source which irradiates the photographic region, according to the pixel region to which the horizontal row which is currently selected by the row selection unit belongs; and the read out unit obtains images which are imaged in each pixel region in order, and creates a synthesized image using these images, while the light emission control unit varies the light emission amount of the light source for the pixel region of each image obtained by the read out unit.

With this structure, electronic shutter processing according to a rolling shutter method is employed, in which the electric charge of each pixel is read out after it has been exposed, while selecting the horizontal rows in order. By doing this, predetermined time period differences are created in the timings at which the various pixel regions are exposed. Accordingly, in the images in the various pixel regions, the same photographic region comes to be photographed at extremely short time period steps. Here, the light emission amount of the light source is varied according to the exposure timing of each of the pixel regions, and the images of the various pixel regions are synthesized together.

The timing of the exposure of each of the pixel regions described above does not depend upon the frame rate of the photographic device or the like. Since the timing of the exposure of each of the pixel regions is determined according to the intervals between the first horizontal rows at each of the pixel regions, accordingly it is possible to acquire a plurality of images at extremely short time period steps. Due to this, with this photographic device, it is possible to reduce the processing time period during the photographic frame processing, and it is possible to create a synthesized image of which the width of the dynamic range has been broadened. Moreover, since it is also not necessary to repeat the photographic frame processing, accordingly, even with a simple structure, it is possible to create a synthesized image of which the width of the dynamic range has been broadened.

Furthermore, the light emission control unit of the present invention may cause the light source to emit light during a time period in which all of the pixels which belong to some one of the pixel regions are being exposed.

Moreover, the light emission control unit of the present invention may stop the light emission by the light source during a time period in which pixels which belong to different ones of the pixel regions are being exposed at the same time.

Even further, the light emission control unit of the present invention may cause the light source to emit light during a time period in which all of the pixels which belong to some one of the pixel regions are being exposed, and may also stop the light emission by the light source during a time period in which pixels which belong to different ones of the pixel regions are being exposed at the same time.

By doing this, for each of the pixel regions, it is possible to make the photographic conditions for all of the pixels which belong to one pixel region, in other words the light emission amount of the light source during exposure of those pixels, almost uniform. Accordingly, it is possible to obtain an image which has been photographed based upon almost uniform photographic conditions for each of the pixel regions.

Still further, with the photographic device of the present invention, the time period from when the row selection unit selects a horizontal row which belongs to some one of the pixel regions, until the row selection unit selects a horizontal row which belongs to some other pixel region, may be longer than the time period during which the row selection unit selects horizontal rows in the same pixel region in order.

DETAILED DESCRIPTION OF THE INVENTION

In the following, an embodiment of the present invention will be explained. It should be understood that although, in the following explanation, this photographic device is explained in terms of its use for service as a surveillance camera, the present invention could be implemented as a photographic device for various different purposes.

A detection signal from an infrared sensor, which is an external device, is inputted to the photographic device of this embodiment. When this external signal is inputted, this photographic device performs photography of a photographic region around the body which has been detected by the infrared sensor. And a synthesized image of expanded width of dynamic range is created from a plurality of images which have been photographed by a single episode of photographic frame processing of the same photographic region.

Figure 1:
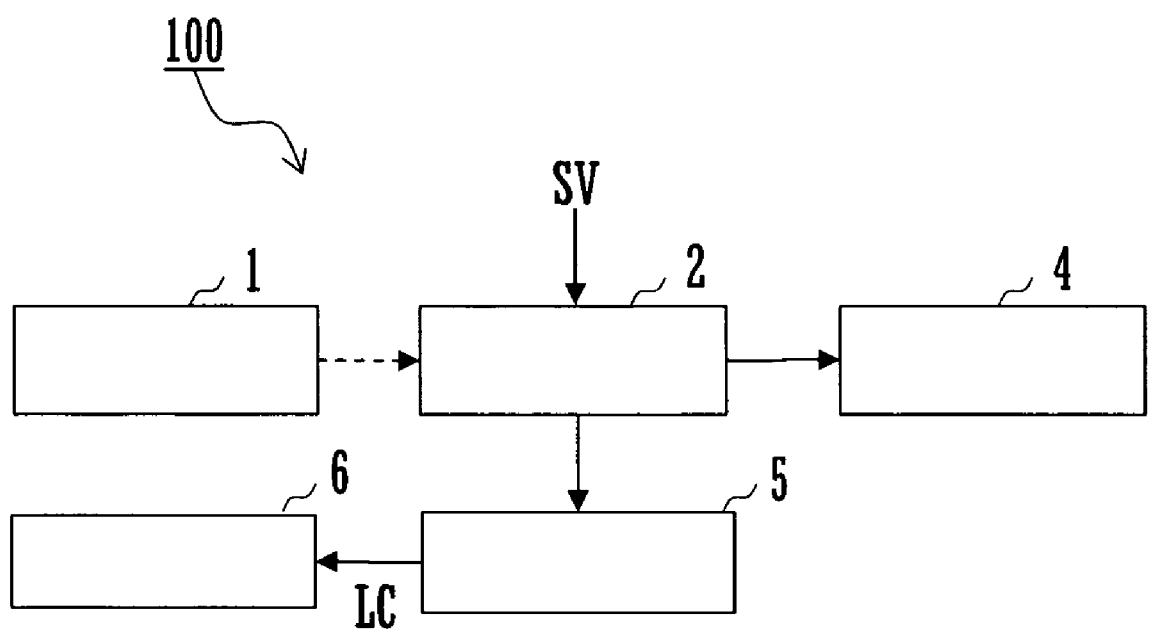
FIG. 1 is a figure for explanation of the structure of a photographic device which is an embodiment of the present invention.

The general structure of the photographic device 100 is shown in FIG. 1. This is a device which performs photography, and, when an external signal is inputted, it outputs a vertical synchronization signal SV to an image sensor 2.

The optical system 1 forms a plurality of images of the same photographic region upon the pixels of the image sensor 2. According to the vertical synchronization signal SV, this image sensor 2 starts photographic frame processing by a rolling shutter method, and acquires a plurality of images of the same photographic region around the body detected by the infrared sensor. The vertical synchronization signal SV is inputted from the image sensor 2 by a light emission control unit 5, which creates a predetermined light emission control signal LC which has been synchronized with the exposure timings of the images of the various photographic regions. And a light source 6 is controlled to emit light by the light emission control signal LC which is inputted thereto by the light emission control unit 5, thus illuminating the photographic region. And an image synthesis unit 4 inputs the image which is acquired by the image sensor 2, and creates a synthesized image.

Figure 2:
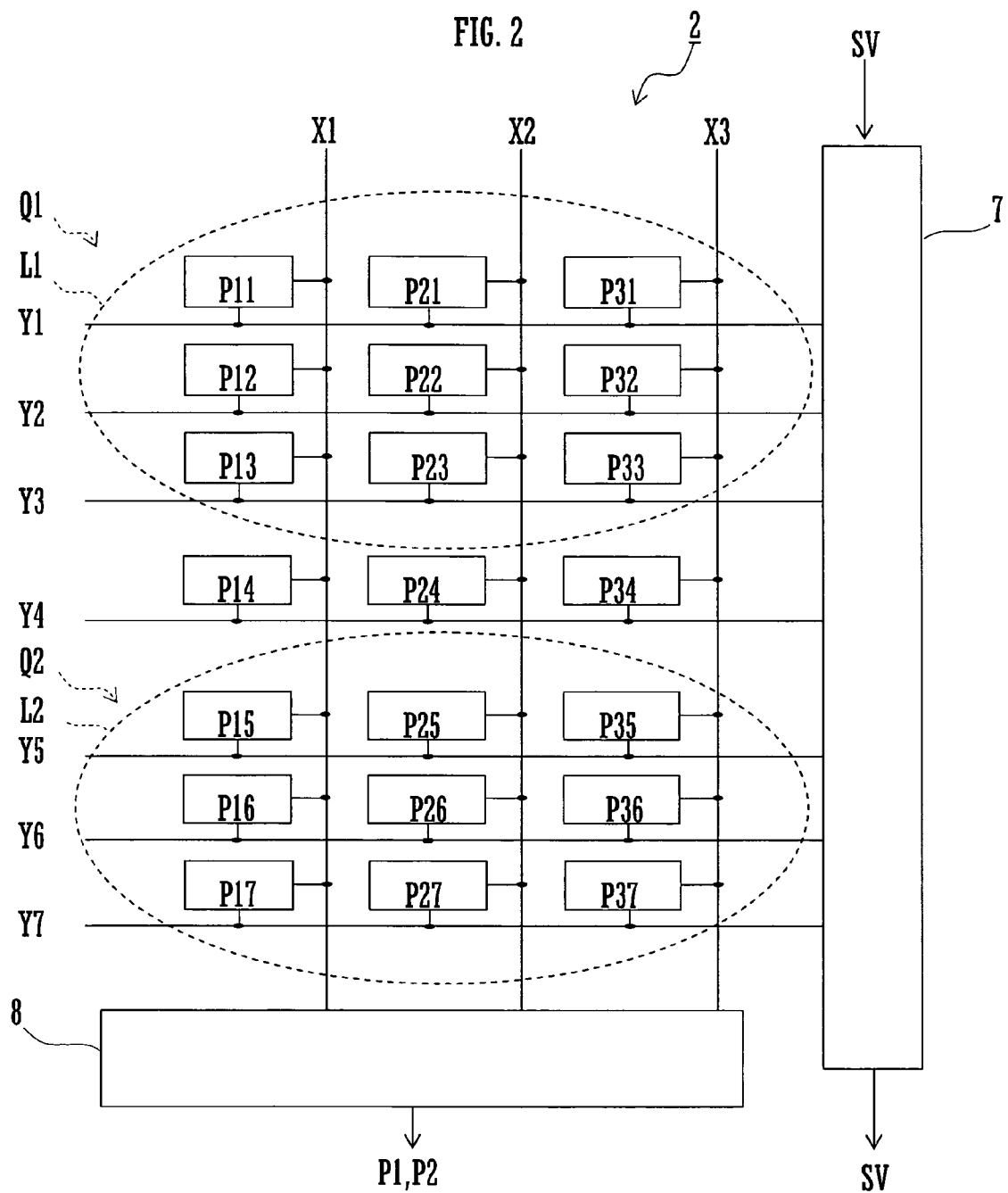
FIG. 2 is a figure for explanation of the structure of an image sensor of this embodiment.

A portion of the structure of the optical system 1 and the image sensor 2 is shown in FIG. 2. The image sensor 2 comprises a plurality of pixels (P11~P37) which are arranged in the form of a matrix, a vertical scan circuit 7, and a horizontal scan circuit 8. It should be understood that although here, for the convenience of illustration, a image sensor 2 with a reduced number of pixels is explained, in actual practice it is preferred for it to be implemented as having several tens of thousands of pixels or more. Furthermore, although each of horizontal drive lines Y1~Y7 and vertical drive lines X1~X3 actually consists of a plurality of signal lines and inputs and outputs various types of signals, the detailed explanation thereof is omitted in this specification; the use of a structure similar to that of a typical image sensor will be acceptable.

The plurality of pixels which are lined up along the horizontal rows of the image sensor 2 (i.e. in the horizontal direction in FIG. 2) are connected to the horizontal drive lines Y1~Y7 for each horizontal row. And the one ends of the horizontal drive lines Y1~Y7 are connected to the vertical scan circuit 7. Furthermore, the plurality of pixels which are lined up along the vertical columns of the image sensor 2 (i.e. in the vertical direction in FIG. 2) are connected to the vertical drive lines X1~X3 for each vertical column. And the one ends of the vertical drive lines X1 through X3 are connected to the horizontal scan circuit 8. The vertical scan circuit 7 corresponds to the "row selection unit" of the Claims, and is connected to the horizontal drive lines Y1~Y7. And the horizontal scan circuit 8 corresponds to the "read out unit" of the Claims, and is connected to the vertical drive lines X~X3.

Furthermore, this image sensor 2 is one in which the plurality of pixels are formed integrally upon a semiconductor substrate. A plurality of optical lenses L1, L2 face the substrate surface of this image sensor 2. These optical lenses L1, L2 are mounted as stacked along the direction of the vertical columns of the image sensor 2, so as to be located on both sides of the pixels P14, P24, P34 of that horizontal row which is connected to the horizontal drive line Y4 at predetermined intervals. It should be understood that, in the following explanation, the region which includes the pixels P11, P12, P13, P21, P22, P23, P31, P32, and P33 which face the optical lens L1 will be termed the pixel region Q1. Moreover, the region which includes the pixels P15, P16, P17, P25, P26, P27, P35, P36, and P37 which face the optical lens L2 will be termed the pixel region Q2. The optical lenses L1, L2 image the same photographic region upon their respective pixel regions Q1 and Q2.

This image sensor 2 performs photographic frame processing by the rolling shutter method. Accordingly, a predetermined time period difference occurs in the exposure timing between the pixel region Q1 and the pixel region Q2, which are stacked in the direction of the vertical columns. Due to this, the images P1, P2 which are read out in order from these pixel regions Q1, Q2 consist of photographs of the same photographic region, taken a predetermined extremely short time period apart.

It should be understood that any arrangement for the optical system 1 will be acceptable, provided that, like the lenses L1, L2 described above, it is one which images the same image upon a plurality of pixel regions. Furthermore, it would also be acceptable for this optical system 1 to have any suitable structure. Moreover, it is preferred to provide a barrier which is positioned at the boundary between the pixel regions, so as to shield stray light which is incident from each of the optical lenses L1, L2 from shining into the adjacent pixel region.

The vertical scan circuit 7 outputs a vertical synchronization signal SV to a light emission control unit 5 shown in FIG. 1. Now, the timing of exposure of each horizontal row upon the image sensor 2, and the timing of light emission by the light source 6 which is controlled by the light emission control unit 5, will be explained with reference to FIG. 3, which is a conceptual figure.

In photographic frame processing by the rolling shutter method, each horizontal row is selected in order. And, first, each of the pixels in the horizontal row which is currently selected is subjected to reset operation, and then, after a predetermined exposure time period has elapsed, the voltage upon each of the pixels due to the accumulated electric charge is outputted. It should be understood that although, in the following explanation, it is assumed that there is no shifting in the timing of the exposure between pixels in the same horizontal row, it would also be acceptable to arranged to shift the exposure timing between these pixels.

Figure 3:
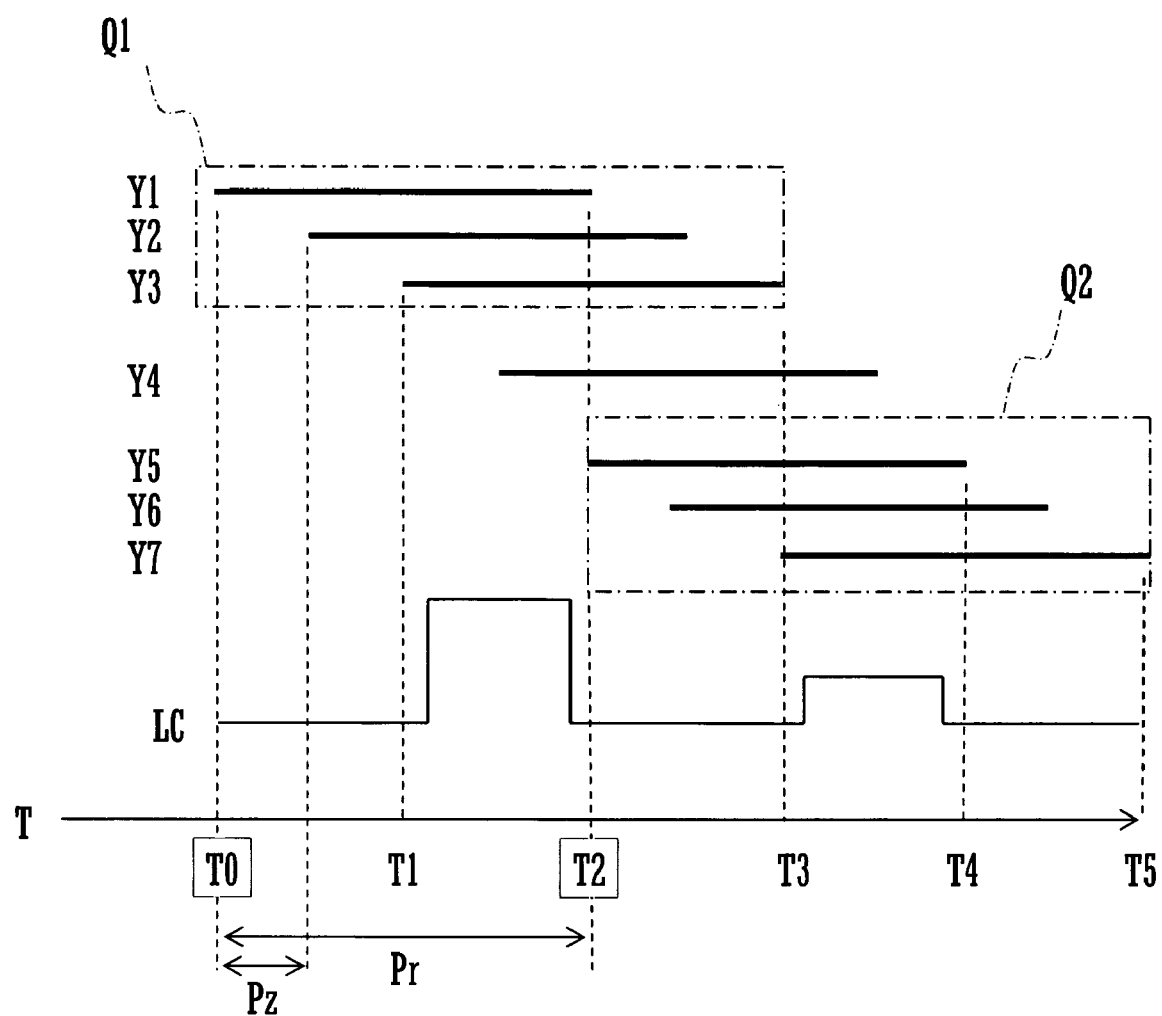
FIG. 3 is a conceptual figure for explaining the timings of light emission and of exposure, in this embodiment.

The horizontal rows of the image sensor 2 are exposed at the exposure timings shown in FIG. 3. Each of these horizontal rows is exposed for just a time period Pr, at timings which are shifted from one to the next by a time period Pz. Thus, the horizontal row which is connected to the horizontal drive line Y1 is exposed from the time instant T0 to the time instant T2. And the horizontal row which is connected to the horizontal drive line Y3 is exposed from the time instant T1 to the time instant T3. Moreover, the horizontal row which is connected to the horizontal drive line Y5 is exposed from the time instant T2 to the time instant T4. Finally, the horizontal row which is connected to the horizontal drive line Y7 is exposed from the time instant T3 to the time instant T5.

Accordingly, the exposure time periods for all of the horizontal rows of the pixel region Q1 are overlapped in the time period from time instant T1 when the horizontal row which is connected to the horizontal drive line Y3 starts to accumulate electric charge until time instant T2 when the reading out of the electric charge from the horizontal row which is connected to the horizontal drive line Y1 is completed.

Furthermore, none of the horizontal rows of the pixel region Q2 is exposed until after the time instant T2. Accordingly, none of the exposure time periods for any of the horizontal rows of the pixel region Q2 overlaps the time period T1~T2.

Thus, by causing the light source 6 to emit light with the light emission control signal LC in this time period T1~T2, it is possible to expose all of the horizontal rows in the pixel region Q1 under uniform photographic conditions. In other words, it is possible to expose all of the horizontal rows of the pixel region Q1 while keeping the light emission amount from the light source almost uniform during their respective exposure time periods. By doing this, the photographic conditions for all of the pixels which belong to the pixel region Q1 may be made to be almost uniform. Therefore, it is possible to obtain an image P1 based upon almost uniform photographic conditions from this photographic region Q1.

Furthermore, the exposure time periods for all of the horizontal rows of the pixel region Q2 are overlapped in the time period from time instant T3 when the horizontal row which is connected to the horizontal drive line Y7 starts to accumulate electric charge until time instant T4 when the reading out of the electric charge from the horizontal row which is connected to the horizontal drive line Y5 is completed. Moreover, none of the horizontal rows of the pixel region Q1 is exposed after the time instant T3. Accordingly, none of the exposure time periods for any of the horizontal rows of the pixel region Q1 overlaps the time period T3~T4.

Thus, by causing the light source 6 to emit light with the light emission control signal LC in this time period T3~T4, it is possible to expose all of the horizontal rows in the pixel region Q2 under uniform photographic conditions. In other words, it is possible to expose all of the horizontal rows of the pixel region Q2 while keeping the light emission amount from the light source almost uniform during their respective exposure time periods. By doing this, the photographic conditions for all of the pixels which belong to the pixel region Q2 may be made to be almost uniform. Therefore, it is possible to obtain an image P2 based upon almost uniform photographic conditions from this photographic region Q2.

Moreover, the light emission amount (i.e. the light emission intensity) of the light source 6 during the time period T1~T2 is made to be greater than the light emission amount (i.e. the light emission intensity) of the light source 6 during the time period T3~T4.

Accordingly, the image P1 which is imaged in the pixel region Q1 and the image P2 which is imaged in the pixel region Q2 are photographed in mutually different photographic conditions. Due to this, it is possible to acquire a plurality of images of the same photographic region while varying their photographic conditions, by a single episode of photographic frame processing.

It should be understood that it would also be acceptable to arrange to vary the light emission amounts of the light source 6 for the various pixel regions, not by varying the light emission intensity of the light source 6, but rather by varying its light emission time period; and thereby, as before, a plurality of images of the same photographic region photographed under different photographic conditions would be acquired. For example, light might be caused to be emitted by the light source 6 over the entire time period from T1 through to T2, while light was caused to be emitted from the light source 6 during half of the time period T3~T4. Moreover, it would also be acceptable to arrange to acquire a plurality of images of the same photographic region under different photographic conditions, by, for example, keeping the light emission amount from the light source 6 during the time period T1~T2 just as it is, while not emitting any light from the light source 6 during the time period T3~T4.

Furthermore, by exposing the horizontal row which is connected to the horizontal drive line Y4 during the time period T1~T2 and also during the time period T3~T4, it comes to be photographed based upon photographic conditions which are different both from those of the horizontal rows in the pixel region Q1 and also from those of the horizontal rows in the pixel region Q2. Accordingly if, before or after the pixel regions (Q1 and Q2), one or more horizontal rows are present which do not belong to any pixel region, then it is possible to photograph the images in each of the image regions Q1, Q2 or the like based upon individually uniform photographic conditions, by performing processing by the image synthesis unit 4 at a later stage, so as to skip over the reading out of the voltages due to the electric charges of these horizontal rows.

By providing one or more horizontal rows which do not belong to any pixel region between the pixel regions Q1, Q2 in this manner, it is possible to make (i.e. to delay) the time period from time instant T1 when an end horizontal row of the pixel region Q1 is selected to time instant T2 when a first horizontal row of the pixel region Q2 is selected longer, than the time period Pz (the horizontal retrace period) at which the horizontal rows are selected in order by the rolling shutter method. By doing this, it is possible to make (i.e. to delay) the light emission time period longer, than the time period at which the horizontal rows are selected in order by the rolling shutter method It should be understood that it would also be acceptable, rather than providing one or more horizontal rows which do not belong to any pixel region, to provide a delay circuit to the horizontal scan circuit. With such a delay circuit, it is also possible to cause a delay for the time period required for a row selection which straddles between the pixel regions.

Figure 4:
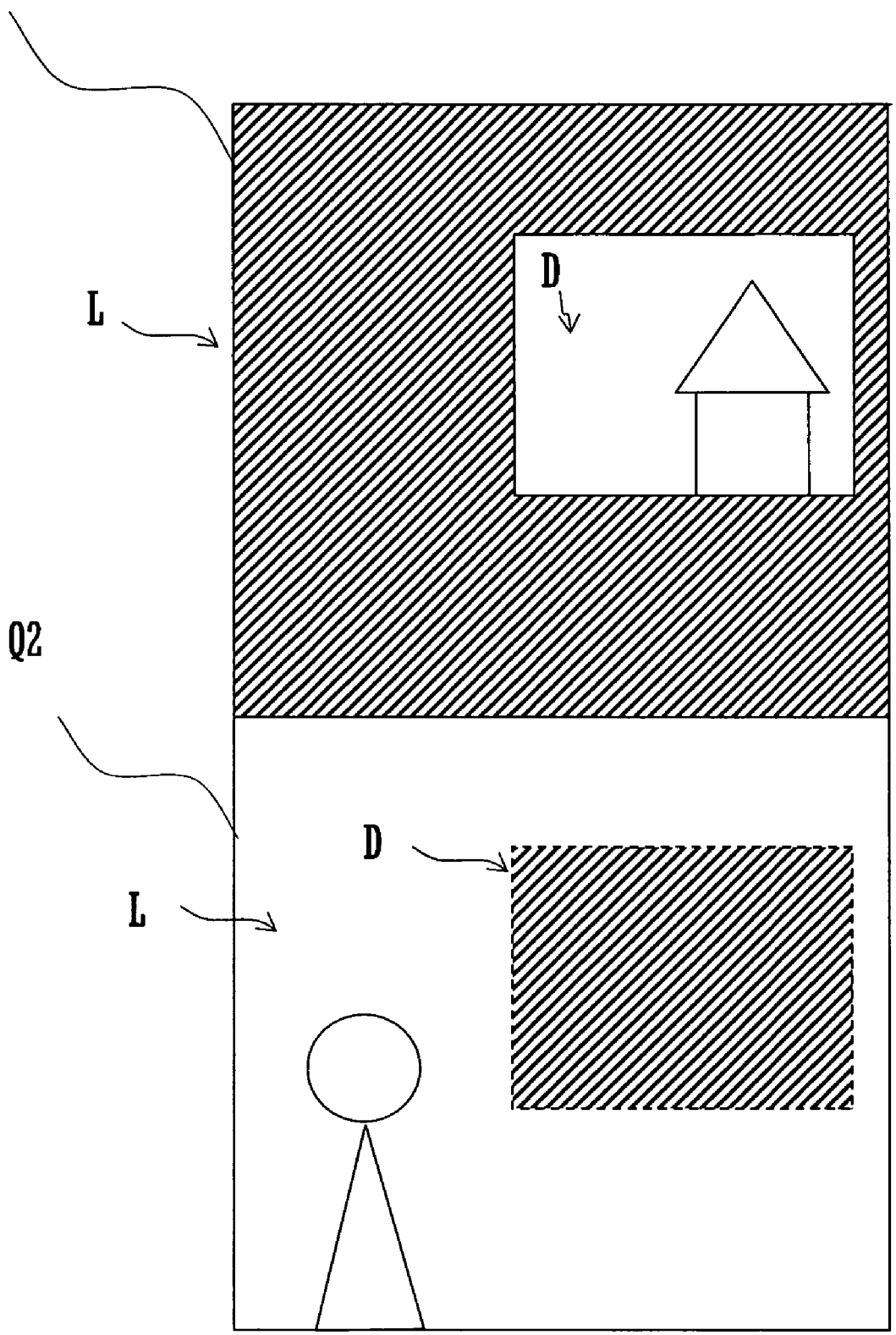
FIG. 4 is a conceptual figure showing image synthesis processing, in this embodiment.

Next, the image synthesis processing by the image synthesis unit 4 will be explained based upon FIG. 4.

The image of the pixel region Q1 and the image of the pixel region Q2 are inputted to this image synthesis unit 4. Here, it will be supposed that the image of the pixel region Q1 has been photographed while causing light emission by the light source at a larger light emission amount than the image of the pixel region Q2.

Here, the case will be explained in which an image is photographed upon the pixel region Q1 and the pixel region Q2, in which a bright region L within a room or the like and a dark region D such as at night or the like are mixed together. The image synthesis unit 4 acquires a synthesized image in which the width of the dynamic range is broadened by synthesizing together the pixels of the images obtained in the pixel regions Q1 and Q2 for which the photographic conditions are optimum. Here, from the pixel region Q1 which has been photographed while causing the light source 6 to emit a large amount of light, the pixels are extracted which represent photography of the dark region D. On the other hand, from the pixel region Q2 which has been photographed while causing the light source 6 to emit a small amount of light, the pixels are extracted which represent photography of the bright region L. The image synthesis unit 4 creates a synthesized image by further mutually adjusting the signal levels of the pixels which have thus been extracted.

In this manner, it is possible for the image synthesis unit 4 to vary the light emission amount of the light source and to acquire a plurality of images which have been photographed under different photographic conditions with one episode of photographic frame processing, to extract from these images for synthesis those pixels whose photographic conditions are optimum, and thereby to synthesize a synthesized image whose width of dynamic range is broadened.

As described above, with this photographic device, it is possible to acquire a plurality of images which differ by an extremely short time period, and it is possible to reduce the processing time period for performing photographic frame processing, and to create a synthesized image the width of whose dynamic range has been broadened.

Furthermore since, with this photographic device, there is no requirement to repeat the photographic frame processing, accordingly, even with a simple structure, it is possible to create a synthesized image the width of whose dynamic range has been broadened.

Furthermore, with this photographic device, it is possible to obtain an image which has been photographed based upon almost uniform photographic conditions for each pixel region.

It should be understood that although, in this embodiment, the image sensor 2 was subdivided into the plurality of two pixel regions Q1, Q2, it would also be acceptable further to subdivide it into a larger number of pixel regions. In such a case, it would be acceptable to create a synthesized image from the images of any two of these pixel regions; or it would also be acceptable to arrange to create a synthesized image from the images of more of the pixel regions. By creating a synthesized image by using more of the images, it is also possible to set the dynamic range of the synthesized image yet finer.

It should be understood that it would also be acceptable to implement the processing performed by the image synthesis unit 4 and the light emission control unit 5 described above by software processing, using an IC or a CPU or the like.

Furthermore, apart from the above, as a component of the optical system, in addition to the optical lenses, it is preferred also to provide an optical throttle or an optical filter or the like.

Finally, in the above described explanation of an embodiment of the present invention, all of the features are shown by way of example, and should not be considered as being limitative of the present invention. The scope of the present invention is not to be defined by any of the features of the embodiment described above, but only be the scope of the appended Claims. Moreover, equivalents to elements in the Claims, and variations within their legitimate and proper scope, are also to be considered as being included within the range of the present invention.

What is claimed is:

1. A photographic device, comprising:
   a single image sensor in which a plurality of pixels are arrayed in the form of a matrix;
   a row selection unit which selects horizontal rows of the single image sensor in order in the vertical direction;
   a read out unit which reads out electric charge from each pixel of the horizontal rows selected by the row selection unit, after exposure thereof;
   an imaging unit which forms a whole image of a photographic region upon each of a plurality of pixel regions, each of the plurality of pixel regions being made of a plurality of horizontal rows, the plurality of pixel regions being arranged in the single image sensor in such a manner as to align in the vertical direction; and
   a light emission control unit which controls the light emission amount of a light source which irradiates the photographic region, according to a pixel region which includes a horizontal row currently selected by the row selection unit;
   wherein:
   the read out unit obtains a plurality of whole images in order from the plurality of pixel regions, and creates a single synthesized whole image using these whole images; and
   the light emission control unit varies the light emission amount of the light source for the pixel region of each image obtained by the read out unit.

2. A photographic device as described in claim 1,
   wherein the light emission control unit causes the light source to emit light at a predetermined timing during a time period in which all of the pixels included in some one of the pixel regions are being exposed.

3. A photographic device as described in claim 1,
   wherein the light emission control unit stops the light emission by the light source all the time during a time period in which pixels included in different ones of the pixel regions are being exposed at the same time.

4. A photographic device as described in claim 1,
   wherein the light emission control unit causes the light source to emit light at a predetermined timing during a time period in which all of the pixels included in some one of the pixel regions are being exposed, and stops the light emission by the light source all the time during a time period in which pixels included in different ones of the pixel regions are being exposed at the same time.

5. A photographic device as described in claim 4,
   wherein a time period from when the row selection unit selects a last one of horizontal rows included in some one of the pixel regions, until the row selection unit selects a first one of horizontal rows included in the next pixel region, is longer than a time period during which the row selection unit selects horizontal rows in the same pixel region in order.

* * * * *